United States Patent [19]

Barrons

[11] 4,061,971

[45] Dec. 6, 1977

[54] CITIZEN BAND RADIO MOUNT

[76] Inventor: Morris R. Barrons, 801 Greenwood Drive, Denton, Tex. 76201

[21] Appl. No.: 730,345

[22] Filed: Oct. 7, 1976

[51] Int. Cl.² .......................................... H01B 1/38
[52] U.S. Cl. .................................. 325/15; 248/346; 224/42.42 R; 325/312; 325/361
[58] Field of Search .................. 325/15, 16, 352, 353, 325/355, 356, 361, 312; 224/42.42 R, 42.46 R, 29; 248/203, 346

[56] References Cited

U.S. PATENT DOCUMENTS

| | | | |
|---|---|---|---|
| 2,867,248 | 1/1959 | Forney | 248/346 |
| 3,059,184 | 10/1962 | Germain | 343/175 |
| 3,071,728 | 1/1963 | Grace et al. | 325/312 |
| 3,110,397 | 11/1963 | Peck et al. | 224/42.42 R |
| 3,163,287 | 12/1964 | Barnett | 224/42.42 R |
| 3,244,981 | 4/1966 | Der Tatevasian | 325/312 |
| 3,405,944 | 10/1968 | Krechman | 325/312 |
| 3,550,001 | 12/1970 | Hanley | 325/15 |
| 3,561,589 | 2/1971 | Larkin, Jr. | 224/29 R |
| 3,804,233 | 4/1974 | Gregg, Jr. | 224/29 R |
| 3,973,202 | 8/1976 | Gardner | 325/353 |

OTHER PUBLICATIONS

May 1977, Four Wheeler Magazine, p. 15, "CB Console".

Primary Examiner—Robert L. Griffin
Assistant Examiner—Michael A. Masinick
Attorney, Agent, or Firm—James C. Fails

[57] ABSTRACT

A CB radio combination adapted to facilitate rapid installation and removal of a CB radio into and from an auto comprising a base tray adapted to conformably fit the floor board of the auto and having a receiving tray depression for receiving a base block; a base block fitting closely within the receiving tray depression and being removable therefrom; a CB radio having readily removable plug-in connectors for connection with a power source and an antenna; and a mounting bracket connected with the CB radio and the base block. The mounting bracket has devices for adjusting the angle so as to fit the CB radio at the desired angle under the dash or the like of the automobile. In this way, the radio and base block can readily be lifted from the base tray for taking into a motel room or the like to prevent theft.

Also disclosed are specific preferred structural embodiments.

15 Claims, 5 Drawing Figures

U.S. Patent  Dec. 6, 1977  Sheet 1 of 2  4,061,971
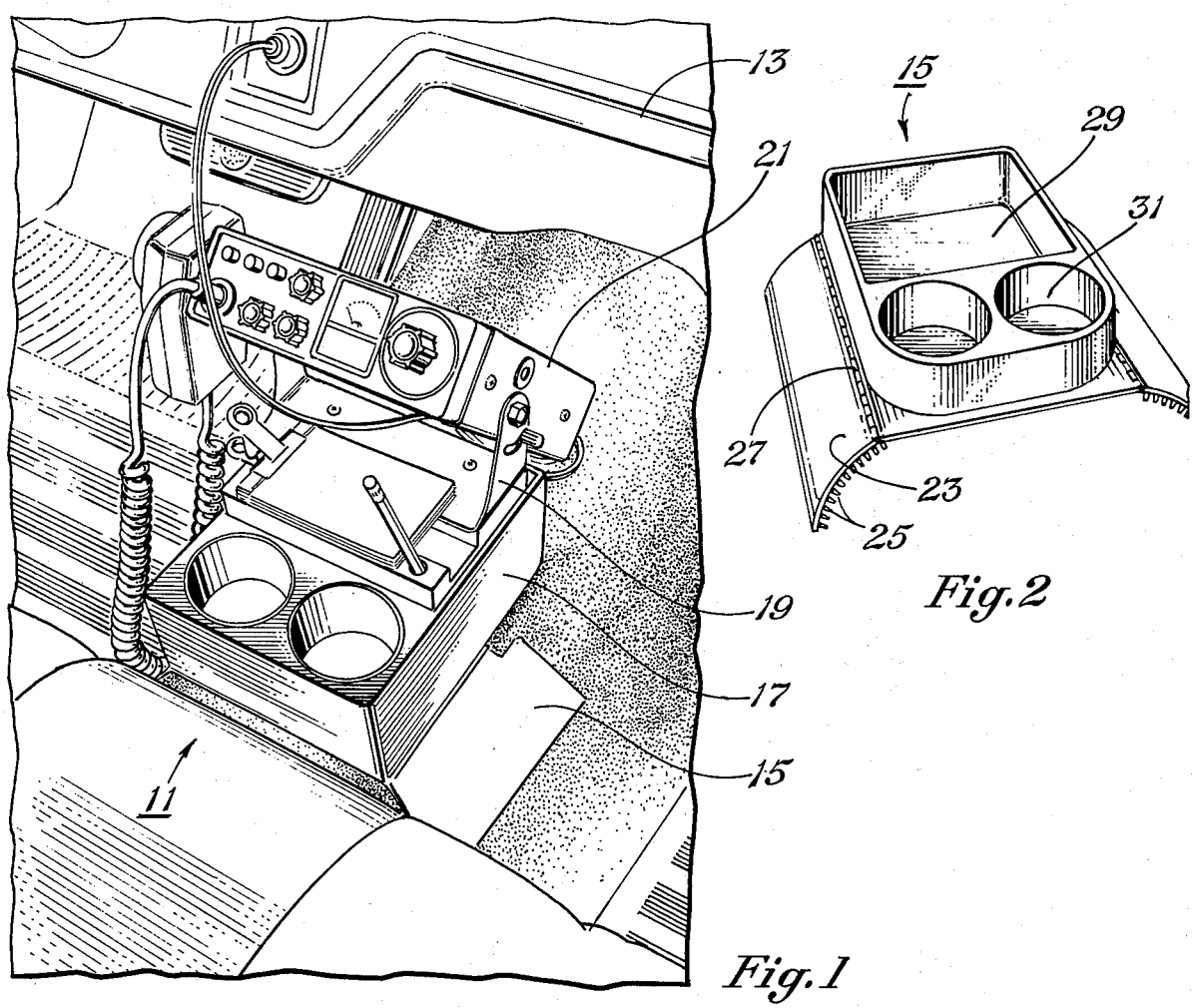
Fig.1
Fig.2
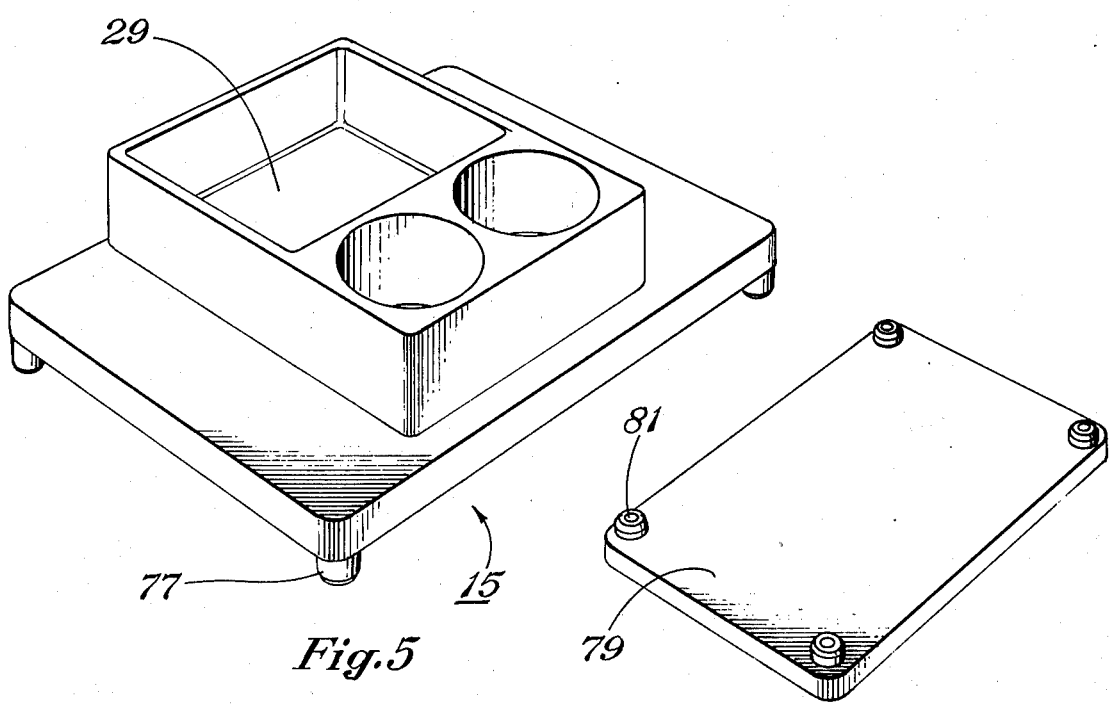
Fig.5

CITIZEN BAND RADIO MOUNT

BACKGROUND OF THE INVENTION:

1. Field of the Invention: This invention relates to a radio combination for installation within a vehicle. More particularly, it relates to apparatus facilitating installation and removal of a Citizens' Band (CB) radio in an automobile or similar vehicle.

2. Description of the Prior Art: The prior art has seen a wide variety of types of apparatuses, or combinations, for installing radios in an automobile or the like. With the advent of the Citizens' Band radio craze, the variety has increased. The types of installations range from those brackets installed by removing a glove compartment such that the CB radio is completely hidden behind the glove compartment facade in order to reduce thefts. Other similar arrangements have included brackets with lock-in apparatuses. None of the brackets and the like that have been installed to date have been completely successful in preventing thefts. On the other hand, they have been expensive and required significant modification of the automotive interior for their installation.

It is desirable that the mounting for the Citizens' Band radio have the following features not heretofore provided by the prior art.

1. The mount should be inexpensive and should readily adapt to the particular vehicle without extensive alterations; particularly alterations to the frame work of the vehicle.

2. The mount should allow and facilitate ready installation and removal of the CB radio such that it can be taken from the vehicle by the driver and taken into motel rooms and the like to prevent theft.

3. The mount should allow installation of the radio, as well as its removal, without the use of tools and without requiring much time.

4. The mount should provide the foregoing, yet be stable to prevent tipping over of the CB radio during talking.

5. The mount should provide the foregoing and note taking capability to help remember call numbers and the like, or in the event there is an emergency.

6. The mount should provide the foregoing features for any instrument or apparatus having structure that can be substituted for the CB radio.

7. The mount should prevent the cost of having the instrument, such as a CB radio, installed by a professional.

None of the foregoing features have been provided by the prior art.

SUMMARY OF THE INVENTION:

Accordingly, it is an object of this invention to provide a Citizens' Band radio combination that has one or more of the features delineated hereinbefore and not heretofore provided by the prior art.

It is a specific object of this invention to provide a Citizens' Band radio combination that has all of the features delineated hereinbefore and not heretofore provided by the prior art.

These and other advantages will become apparent from the following descriptive matter, particularly when taken in conjunction with the appended drawings.

In accordance with this invention, there is provided a Citizens' Band radio combination adapted to facilitate rapid installation and removal of a CB radio into and from an automobile having a floor board characterized by base tray adapted to conformingly fit the floorboard and having a receiving tray depression of predetermined longitudinal, lateral and depth dimensions for receiving a base block; a base block inserted within and closely and conformably fitting the receiving tray depression and having a mounting bracket and a CB radio adjustably connected thereto such that the base block, mounting bracket and radio can be readily removed, as for taking into a motel or the like to prevent theft. The base block has a vacuum relief means for facilitating relieving the vacuum as it is pulled out of the receiving tray depression. The mounting bracket and the CB radio are connected together such that the CB radio can be pivoted to the desired angle to fit into the automobile or the like as desired. The CB radio has readily removable plug-in connectors for connecting with a power source and an antenna.

In a preferred embodiment, a note pad holder and note pad, with or without pencils, are connected with the base block so as to facilitate remembering code names, taking emergency messages and the like. Preferably, the base block is formed of wood to facilitate screwing of the various accoutrements thereto. Weights may be added to the base block as desired. For stability, the base blocks should be at least 20 percent (%) as heavt as the CB radio, and it should have the center of gravity of the CB radio disposed in near vertical alignment with its center of gravity.

BRIEF DESCRIPTION OF THE DRAWINGS:

FIG. 1 is a partial perspective view of one embodiment of this invention showing a CB radio installed in an automobile;

FIG. 2 is an isometric view of the base tray of the embodiment of FIG. 1;

FIG. 5 is an isometric view of another base tray in accordance with another embodiment of this invention.

DESCRIPTION OF PREFERRED EMBODIMENT(S)

Figure 3:
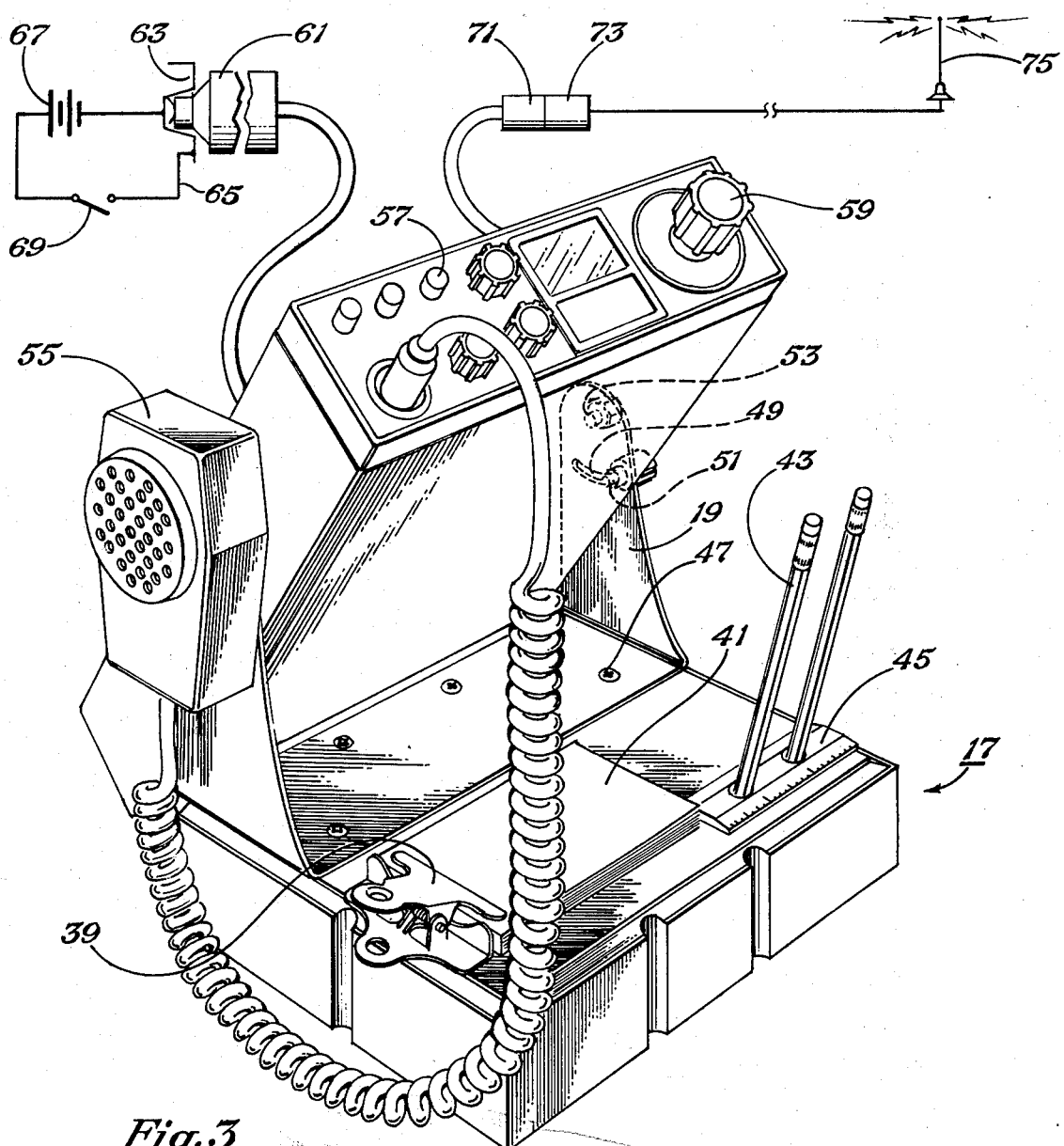
FIG. 3 is an isometric view of the CB radio, mounting bracket, and base block of FIG. 1 adapted to be lifted from the automobile.
Figure 4:
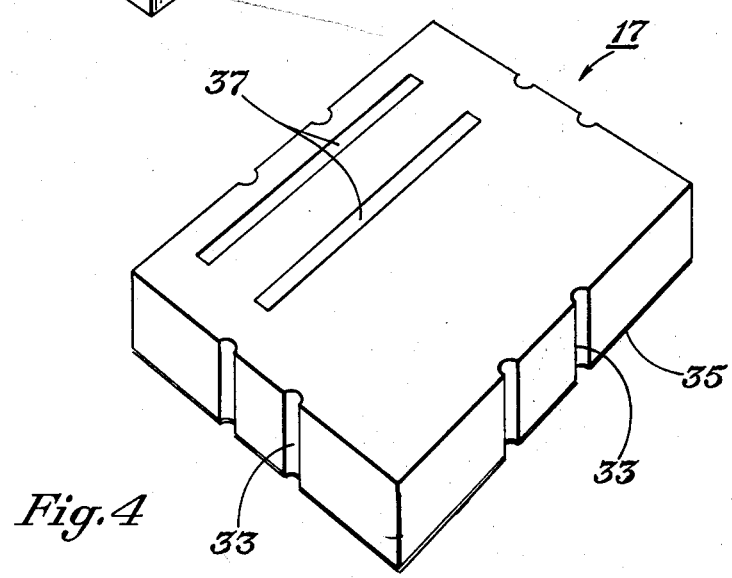
FIG. 4 is an isometric view of a base block in accordance with an embodiment of this invention.

Referring to the FIGS. 1-4; and particularly to FIG. 1, the CB radio combination 11 is illustrated in the installed position beneath the dashboard 13 of an automobile. CB radio combination 11 includes a base tray 15, a base block 17, a mounting bracket 19 and a CB radio 21.

The base tray 15 is adapted to conformingly fit the floorboard of the automobile to afford a stable base within which to fit the base block and the CB radio. As can be seen in FIG. 2, the base tray 15 is arcuate along its bottom with adjustable side panels 23 for fitting an automobile with a drive shaft incursion, or arcuate intrusion, in the floorboard. As illustrated, the side panel 23 have teeth 25 for engaging the carpet in the floorboard of the automobile for preventing overturning of the radio during use. Although the illustrated side panels are arcuate, they may be substantially straight. They are mounted on suitable hinges, such as hinges 27, that have springs or otherwise resist the moving apart of the side panels 23 once they have their teeth 25 engaged with the carpet of the floorboard. The base tray 15 has a base receiving tray depression 29 for receiving the base block 17 and the CB radio 21. The tray depression 29 has predetermined dimensions adequate to stabilize the CB radio. For example, the depression 29 may have a length in the range of from 4-10 inches, a width in the range of 2-5 inches and a depth in the range of 1-3 inches. In the illustrated embodiment, the depression 29 has a length of about 6⅝ inches, a width of about 4¼ inches and a depth of about 1¾ inches.

The base tray 15 may be made of any materials that have adequate structural strength. For economy reasons, the metal or plastic materials are preferred. These metal materials include steel, whether painted or plated with tin or the like; aluminum; or magnesium. Although the thermosetting plastics; such as, the phenol formaldehyde copolymers; can be employed, it is preferred to employ the thermoplastic materials; such as the polyethylene, polystyrene, polypropylene, and the acrylonitrile butadiene styrene copolymer (ABS). Other plastics that can be cast in the desired shape can be employed, of course. In the illustrated embodiment, the base tray 15 also includes a pair or receptacles 31 for receiving glasses of cold drink and the like. These receptacles 31 are also useful for including paper clips and other accoutrements. Moreover, the extra width (dimension longitudinally of the automobile in FIG. 1) of the base tray 15 with the receptacles increases the stability, as compared with no receptacles and merely being wide enough to receive the base block 17.

The base block 17 is dimensioned to fit closely and conformably within the receiving tray depression 29. The base block 17 has length, width and height dimensions substantially the same as the length, width and depth dimensions of the receiving tray depression 29. Since the base block 17 is dimensioned to fit so closely, it has vacuum relief means for facilitating insertion, or installation, and removal from the receiving tray depression. As illustrated, the vacuum relief means includes slots, or grooves, 33, FIG. 4, traversing upwardly along the thickness of the base block. This allows removal without creating a vacuum beneath the base block. As illustrated, the bottom of the base block 17 is covered with felt 35 or the like to prevent marring surfaces on which the base block 17 is set. It is preferred that the base block 17 have a substantial weight in order to stabilize the mounting of the CB radio as much as possible. The amount of weight will depend on how closely it fits. Preferably, the base block will weigh about 20 percent as much as the CB radio weighs. To obtain this weight, it may be necessary to embed weights 37 within the base block 17, as illustrated.

To facilitate use of the CB radio, a note pad holder 39, FIG. 3, such as a clip board, is fastened to the base block 17. A note pad 41 is emplaced in the note pad holder for writing messages, call numbers and the like thereon. Writing instruments 43 are also affixed to the base block 17. If desired, a ruler 45 or the like may be employed.

The base block may be made of any of the materials having the desired weight characteristics. Preferably, the base block 17 is formed of wood to facilitate fastening thereto the accoutrements and the mounting bracket 19.

The mounting bracket 19 is connected with the base block 17 by suitable means. Suitable means includes adhesion, bolts, screws and any other conventional way. As illustrated, the mounting bracket 19 is connected to the base block 17 by screws 47. The ability to use the screws for fastening on the note pad holders, the mounting bracket 19 and the like is a distinct advantage. As illustrated, the mounting bracket 19 traverses across the top of the note pad holder. It may be affixed along only the ends if desired. The traverse along the entire top adds stability. The mounting bracket 19 may be formed of any of the material, such as the dilineated metals and plastics discussed hereinbefore with respect to the base tray 15. Preferably, the mounting bracket 19 is formed of metal such as steel for structural strength and durability. The mounting bracket 19 has an arcuate slot 49 for receiving a bolt or screw 51 along side of the radio to allow tilting the radio to a desired angle and retaining the set angle.

The mounting bracket 19 has other suitable fulcrum mount, such as bolt 53, for connecting with the CB radio 21 so as to allow the pivoting thereof.

The CB radio 21, as indicated, is pivotally carried by the mounting bracket 19 so as to allow adjustment to the proper attitude to fit least obtrusively into the vehicle, or automobile; yet, still be readily accessible to the driver for talking and the like. The CB radio may comprise merely a CB monitor, or receiver. Preferably, as illustrated, the CB radio 21 comprises a full radio with both transmitter and receiver. The CB radio 21 may comprise any of the conventional and readily available units. As illustrated, it has the full complement of controls, including microphone 55, channel selector 57 and volume control 59. The CB radio 21, the mounting bracket 19, and the base block 17 are all adapted to be readily lifted from the base tray 15 and removed from the automobile to prevent theft. Toward this end, the radio has plug-in connectors for connecting respectively with the power source and the antenna. Specifically, the CB radio 21 has a plug-in unit 61 for plugging into a cigarette lighter 63 in a conventional circuit 65 having a battery 67 and a switch 69, such as a conventional automobile electrical system. Similarly, the CB radio has its conventional bayonet connector 71 for connecting with a receiving connector 73 and antenna 75.

In operation, the described base tray 15 is emplaced on the automobile floorboard in conforming fit therewith. To this end, the side panels 23 are fitted to the side of the "hump" or drive shaft incursion, if there be one, as illustrated. The base block 17 is formed as described hereinbefore. The mounting bracket 19 is connected with the base block 17, as by screws 47. The CB radio is then mounted as by the pivotal bolt 53 and the respective slots 49 and bolts 51 for obtaining the desired position. The respective accoutrements; such as, the note pad holder 39, note pad 41, and writing instruments 43; are affixed. The base block 17, mounting bracket 19, and CB radio 21 are then emplaced with the base block 17 inserted within the tray depression 29 of the base tray 15. The plug-in unit 61 is plugged into the cigarette lighter for power. The bayonet connector 71 is connected with the antenna connector 73 and the radio is ready to operate.

The driver then proceeds down the highway using the CB radio with appropriate note taking and the like as usual. Upon reaching the destination, such as the motel room for the night, the operator simply unplugs the unit and connector 61 and 71 and lifts the radio 21, bracket 19 and block 17 from the base tray 15. The respective slots, or grooves, 33 prevent vacuum forming and facilitates lifting the radio-block unit from its base tray 15. He then carries them with him to the motel room. The felt 35 allows the base block to sit on the motel furniture without causing any damage, such as scratches.

When the operator is again ready to install the radio, it is installed simply by setting the radio-block into the tray and plugging in, as described hereinbefore; and he is ready to go again.

Another embodiment of the invention is illustrated in FIG. 5. Therein, the base tray 15 is in a form of a less arcuate tray for fitting floorboards with less arcuate intrusions, such as Oldsmobile Toronados, Cadillac El Dorados, and vans. As described hereinbefore the base tray 15 will still have the receiving tray depression 29 for receiving the base block 17. The base tray 15 may have resilient legs 77 for attenuating the shock, alone or in conjunction with mounting pads 79 with additional resilient mounts 81. In any event, the base tray 15 provides non-tipping support for receiving the radio 21, bracket 19, block 17 unit. Moreover, the base tray 15 is operative as described hereinbefore with respect to the arcuate base tray 15. Similarly as described hereinbefore, it may be formed of any of the conventional materials; such as molded from the plastics described hereinbefore, stamped from sheet metal, or the like.

While adjustable side panels have been described hereinbefore, the fixed and rigid side panels achieve greater rigidity and resistance tipping. If adjustable side panels are employed, they can be weighted or otherwise stabilized.

Although this invention has been described with respect to mounting a CB radio, the base tray and base block can be employed for mounting any other instruments or apparatuses that can be affixed similarly as described with respect to the CB radio. For example, they can be employed for mounting tape decks, special clocks, and the like.

From the foregoing it can be seen that this invention provides apparatus for mounting a Citizens' Band radio that obviates the disadvantages of the prior art and achieves the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. A Citizens' Band (CB) radio combination adapted to facilitate rapid installation and removal of a Citizens' Band radio into and from a vehicle having a floorboard, comprising:
   a. a base tray adapted to conformably fit the floorboard of the vehicle; said base tray having a receiving tray depression of predetermined longitudinal, lateral and depth dimensions for receiving a base block;
   b. a base block conformably and removably received in said receiving tray depression and dimensioned to fit closely and conformably therewithin; said base block having vacuum relief means facilitating installation and removal from said receiving tray depression;
   c. a mounting bracket connected with said base block and having means for connecting with a CB radio; said mounting bracket having angle adjusting means so as to fit a CB radio in said vehicle as desired; and
   d. a CB radio having readily removable plug-in connectors for connections with a power source and with an antenna; said CB radio being connected to said mounting bracket so as to be set at a plurality of angles with respect to said base block and said base tray; such that said CB radio can be readily set into and lifted from said base tray by way of said mounting bracket and said base block to facilitate installation and removal from said vehicle, as for preventing theft, without requiring tools for unfastening dash mountings and the like.

2. The radio combination of claim 1 wherein a note pad holder and note pad are connected with said base block to facilitate taking messages and the like in employing said CB radio.

3. The radio combination of claim 1 wherein said base block is wood.

4. The radio combination of claim 3 wherein said base block has weights embedded therein so as to have a weight of at least 20% that of a CB radio connected therewith so as to stabilize the mounting thereof.

5. The radio combination of claim 1 wherein said vacuum means includes slots traversing upwardly along the thickness of said base block to relieve the vacuum as said base block is pulled from said receiving tray depression.

6. The radio combination of claim 1 wherein said base tray is substantially flat for fitting vehicles with substantially flat floorboards.

7. The radio combination of claim 1 wherein said base tray is arcuate with adjustably positionable side panels for fitting automobiles with an arcuate intrusion in said floorboard.

8. The radio combination of claim 7 wherein said side panels have teeth on their bottom for engaging carpet in said floorboard for preventing tipping over and adding stability.

9. A combination adapted to facilitate rapid installation and removal of an instrument into and from a vehicle having a floorboard, comprising:
   a. a base tray adapted to conformably fit the floorboard of the vehicle; said base tray having a receiving tray depression for predetermined longitudinal, lateral and depth dimensions for receiving a base block;
   b. a base block conformably and removably received in said receiving tray depression and dimensioned to fit closely and conformably therewithin; said base block having vacuum relief means facilitating installation and removal from said receiving tray depression;
   c. a mounting means for connecting said base block with said instrument; such that said instrument can be readily set into and lifted from said base tray by way of said mounting bracket and said base block to facilitate installation and removal from said vehicle, as for preventing theft, without requiring tools for unfastening dash mountings and the like.

10. The combination of claim 9 wherein said base block is wood.

11. The combination of claim 10 wherein said base block has weights embedded therein.

12. The combination of claim 9 wherein said vacuum means includes slots traversing upwardly along the thickness of said base block to relieve the vacuum as said base block is pulled from said receiving tray depression.

13. The combination of claim 9 wherein said base tray is substantially flat for fitting vehicles with substantially flat floorboards.

14. The combination of claim 9 wherein said base tray is arcuate for fitting automobiles with an arcuate intrusion in said floorboard.

15. The combination of claim 14 wherein said side panels have teeth on their bottom for engaging carpet in said floorboard for preventing tipping over and adding stability.

* * * * *